(12) United States Patent
Hanussek et al.

(10) Patent No.: US 11,685,034 B2
(45) Date of Patent: Jun. 27, 2023

(54) HANDHELD WORK APPARATUS

(71) Applicant: Andreas Stihl AG & Co. KG, Waiblingen (DE)

(72) Inventors: Sebastian Hanussek, Remseck (DE); Jan Rieger, Auenwald (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 425 days.

(21) Appl. No.: 16/854,706

(22) Filed: Apr. 21, 2020

(65) Prior Publication Data
US 2020/0246957 A1    Aug. 6, 2020

Related U.S. Application Data

(63) Continuation-in-part of application No. 15/361,291, filed on Nov. 25, 2016, now Pat. No. 10,675,694, which is a continuation of application No. PCT/EP2015/001007, filed on May 15, 2015.

(51) Int. Cl.
| | |
|---|---|
| *B25F 5/00* | (2006.01) |
| *F16D 65/14* | (2006.01) |
| *F16D 121/22* | (2012.01) |
| *B27B 9/00* | (2006.01) |
| *B27B 5/38* | (2006.01) |

(52) U.S. Cl.
CPC ............. *B25F 5/001* (2013.01); *F16D 65/14* (2013.01); *B27B 5/38* (2013.01); *B27B 9/00* (2013.01); *F16D 2121/22* (2013.01)

(58) Field of Classification Search
CPC ............. B25F 5/001; B27B 5/29; B27B 5/38
USPC .................................. 30/388–391, 369–378
See application file for complete search history.

(56) References Cited

U.S. PATENT DOCUMENTS

| | | | | |
|---|---|---|---|---|
| 2,455,840 | A | | 12/1948 | Webb |
| 2,889,014 | A | * | 6/1959 | Goetz ..................... F16D 59/02 188/196 M |
| 3,476,223 | A | * | 11/1969 | Hubbard ................... H01F 7/20 188/164 |
| 3,513,888 | A | | 5/1970 | Townsend et al. |

(Continued)

FOREIGN PATENT DOCUMENTS

| | | |
|---|---|---|
| CN | 88206576 U | 12/1988 |
| CN | 1097365 A | 1/1995 |

(Continued)

OTHER PUBLICATIONS

International Search Report dated Aug. 31, 2015 of international application PCT/EP2015/001007 on which this application is based.

(Continued)

*Primary Examiner* — Adam J Eiseman
*Assistant Examiner* — Richard D Crosby, Jr.
(74) *Attorney, Agent, or Firm* — Walter Ottesen, P.A.

(57) ABSTRACT

A handheld work apparatus includes a work tool, a belt drive, a drive motor configured to drive the work tool via the belt drive, a brake unit configured to act on the belt drive, and a holding arrangement. The brake unit has a braking position and a released position and the holding arrangement is configured to hold the brake unit in the released position. The holding arrangement includes an electromagnet to which current is supplied during operation of the work apparatus.

15 Claims, 7 Drawing Sheets

(56) References Cited

U.S. PATENT DOCUMENTS

| | | | | |
|---|---|---|---|---|
| 3,703,654 | A * | 11/1972 | Karubian | B27B 5/38 |
| | | | | 30/369 |
| 3,735,489 | A | 5/1973 | Zatorsky, Jr. | |
| 3,785,230 | A | 1/1974 | Lokey | |
| 4,006,528 | A | 2/1977 | Katsuya | |
| 4,156,477 | A * | 5/1979 | Nagashima | B27B 17/083 |
| | | | | 188/77 R |
| 4,402,138 | A * | 9/1983 | Glockle | B27B 17/083 |
| | | | | 200/61.45 M |
| 4,432,139 | A * | 2/1984 | Kohler | B27B 17/083 |
| | | | | 30/381 |
| 4,493,400 | A * | 1/1985 | Nagashima | B27B 17/083 |
| | | | | 30/381 |
| 4,528,881 | A | 7/1985 | Harris | |
| 4,555,849 | A | 12/1985 | Ando et al. | |
| 4,574,531 | A | 3/1986 | McCurry | |
| 4,683,660 | A * | 8/1987 | Schurr | F16D 49/08 |
| | | | | 30/381 |
| 4,753,012 | A * | 6/1988 | Schurr | B27B 17/083 |
| | | | | 83/DIG. 1 |
| 4,757,881 | A * | 7/1988 | Jonsson | B27B 17/083 |
| | | | | 188/77 R |
| 4,811,487 | A * | 3/1989 | Takahashi | B27B 17/083 |
| | | | | 188/166 |
| 4,847,513 | A | 7/1989 | Katz et al. | |
| 4,920,649 | A * | 5/1990 | Strom | F16P 3/00 |
| | | | | 318/116 |
| 5,058,470 | A | 10/1991 | Froehlich | |
| 5,063,319 | A * | 11/1991 | Mason | H02K 5/148 |
| | | | | 310/158 |
| 5,101,567 | A * | 4/1992 | Cool | B27B 17/083 |
| | | | | 83/DIG. 1 |
| 5,572,916 | A * | 11/1996 | Takano | B23D 47/12 |
| | | | | 83/72 |
| 5,690,391 | A * | 11/1997 | Kingsley | B27B 9/02 |
| | | | | 83/928 |
| 5,709,032 | A * | 1/1998 | Mizutani | B27B 17/083 |
| | | | | 188/77 R |
| 5,789,885 | A * | 8/1998 | Seel | B24B 23/00 |
| | | | | 318/123 |
| 5,855,067 | A * | 1/1999 | Taomo | B25F 3/00 |
| | | | | 474/138 |
| 5,856,715 | A * | 1/1999 | Peot | B23D 47/12 |
| | | | | 310/90 |
| 6,037,729 | A * | 3/2000 | Woods | H02P 3/12 |
| | | | | 318/245 |
| 6,039,037 | A | 3/2000 | Taomo et al. | |
| 6,233,831 | B1 | 5/2001 | Iida et al. | |
| 6,236,177 | B1 * | 5/2001 | Zick | B27B 5/38 |
| | | | | 318/362 |
| 6,374,501 | B1 | 4/2002 | Claesson | |
| 6,564,459 | B1 | 5/2003 | Steinbrueck et al. | |
| 6,680,596 | B1 * | 1/2004 | DeCicco | H01R 39/42 |
| | | | | 388/811 |
| 7,059,228 | B2 | 6/2006 | Chang | |
| 7,252,027 | B2 | 8/2007 | Meredith et al. | |
| 8,061,043 | B2 | 11/2011 | Allen et al. | |
| 8,418,590 | B2 | 4/2013 | Agan et al. | |
| 8,469,167 | B2 | 6/2013 | Hanussek et al. | |
| 8,747,281 | B2 * | 6/2014 | Lindblad | F16D 67/02 |
| | | | | 477/204 |
| 8,939,857 | B2 | 1/2015 | Doering et al. | |
| 8,978,531 | B2 | 3/2015 | Schaeferling | |
| 8,998,684 | B2 | 4/2015 | Rosani et al. | |
| 9,073,232 | B2 | 7/2015 | Schell | |
| 9,353,721 | B2 | 5/2016 | Eberle et al. | |
| 9,713,881 | B2 | 7/2017 | Zimmermann et al. | |
| 10,054,924 | B2 * | 8/2018 | Willgert | G06F 11/3013 |
| 10,371,044 | B2 | 8/2019 | Karrar | |
| 10,675,694 | B2 * | 6/2020 | Hanussek | B23D 47/12 |
| 10,703,006 | B2 * | 7/2020 | Levien | B24B 47/26 |
| 10,720,860 | B2 * | 7/2020 | Westerby | H02P 7/29 |
| 10,816,048 | B2 * | 10/2020 | Schneider | F16D 63/002 |
| 10,865,941 | B2 * | 12/2020 | Lewis | H02K 11/26 |
| 10,905,053 | B2 * | 2/2021 | Eppinger | A01G 23/099 |
| 10,926,341 | B2 * | 2/2021 | Cuzdey | B27B 9/02 |
| 11,135,665 | B2 * | 10/2021 | Martinsson | B23D 59/001 |
| 2002/0017175 | A1 * | 2/2002 | Gass | B27G 19/02 |
| | | | | 83/485 |
| 2002/0017336 | A1 * | 2/2002 | Gass | B23D 59/001 |
| | | | | 144/2.1 |
| 2003/0005588 | A1 * | 1/2003 | Gass | B23D 51/166 |
| | | | | 30/382 |
| 2007/0163409 | A1 | 7/2007 | Nishikawa et al. | |
| 2008/0276784 | A1 | 11/2008 | Zhang | |
| 2009/0193669 | A1 * | 8/2009 | Gorenflo | B27B 17/083 |
| | | | | 30/277.4 |
| 2010/0218388 | A1 * | 9/2010 | Myers | F16D 49/08 |
| | | | | 188/77 W |
| 2010/0237970 | A1 | 9/2010 | Liu | |
| 2010/0257743 | A1 * | 10/2010 | George | B27B 17/083 |
| | | | | 83/62.1 |
| 2010/0300256 | A1 | 12/2010 | Loewe et al. | |
| 2010/0300257 | A1 | 12/2010 | Loewe et al. | |
| 2011/0001102 | A1 | 1/2011 | Hossler | |
| 2011/0113939 | A1 | 5/2011 | Simon | |
| 2012/0036725 | A1 * | 2/2012 | Osborne | B27B 17/083 |
| | | | | 83/62.1 |
| 2013/0145634 | A1 * | 6/2013 | Cuzdey | B23D 61/025 |
| | | | | 30/376 |
| 2014/0215839 | A1 | 8/2014 | Abe et al. | |
| 2014/0251105 | A1 | 9/2014 | Vinarcik | |
| 2015/0258658 | A1 | 9/2015 | Steingruber et al. | |
| 2015/0258703 | A1 | 9/2015 | Steingruber et al. | |
| 2015/0360305 | A1 * | 12/2015 | Willgert | B27B 17/0025 |
| | | | | 30/272.1 |
| 2017/0066068 | A1 | 3/2017 | Hanussek et al. | |
| 2017/0368618 | A1 | 12/2017 | Harris | |
| 2018/0050398 | A1 * | 2/2018 | Kumakura | B23D 45/16 |
| 2018/0179023 | A1 | 6/2018 | Rebillard et al. | |

FOREIGN PATENT DOCUMENTS

| | | |
|---|---|---|
| CN | 1276282 A | 12/2000 |
| CN | 201702452 U | 1/2011 |
| CN | 201735891 U | 2/2011 |
| CN | 102069422 A | 5/2011 |
| CN | 202539686 U | 11/2012 |
| CN | 103527686 A | 1/2014 |
| CN | 104227791 A | 12/2014 |
| CN | 104308261 A | 1/2015 |
| DE | 42 13 617 A1 | 10/1993 |
| EP | 0 042 918 A1 | 1/1982 |
| GB | 191501284 A | 1/1916 |
| JP | 2012196735 A | 10/2012 |
| WO | 2015/180829 A1 | 12/2015 |

OTHER PUBLICATIONS

English translation of Written Opinion of the International Searching Authority dated Jul. 20, 2015 in international patent application PCT/EP2015/001007 on which the claim of priority is based.

English Translation and First Office Action of the Chinese Patent Office dated Jan. 17, 2018 in the corresponding Chinese patent application 201580026873.2.

English translation of the first Office action and search report of Chinese State Intellectual Property Office dated Mar. 27, 2018 of corresponding Chinese patent application 201580026877.0.

English Translation and Office Action of the Chinese Patent Office dated Sep. 18, 2019 in the corresponding Chinese patent application 201810863674.2.

* cited by examiner

Fig. 1
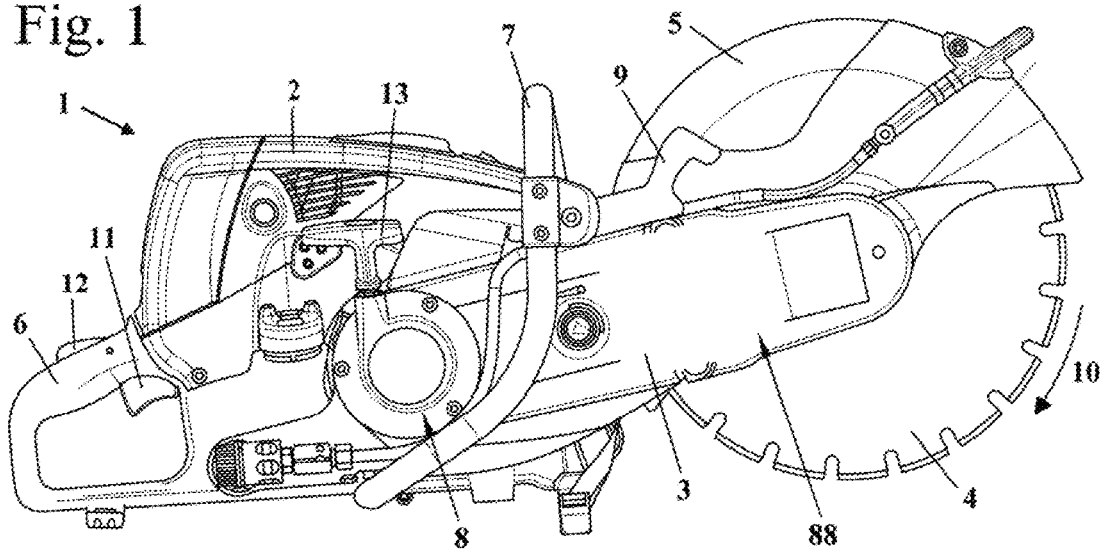
Fig. 2
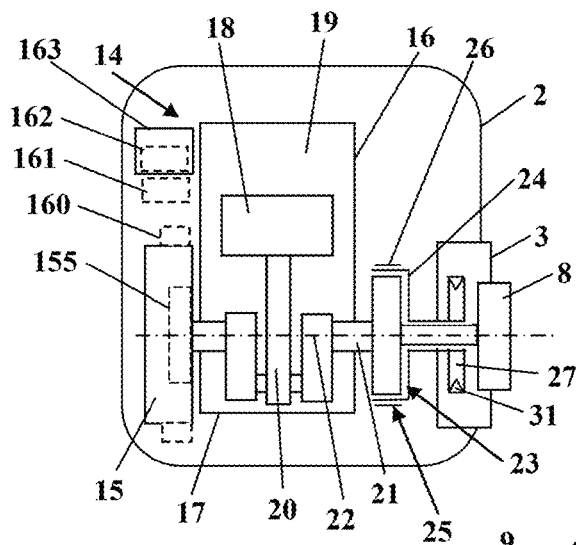
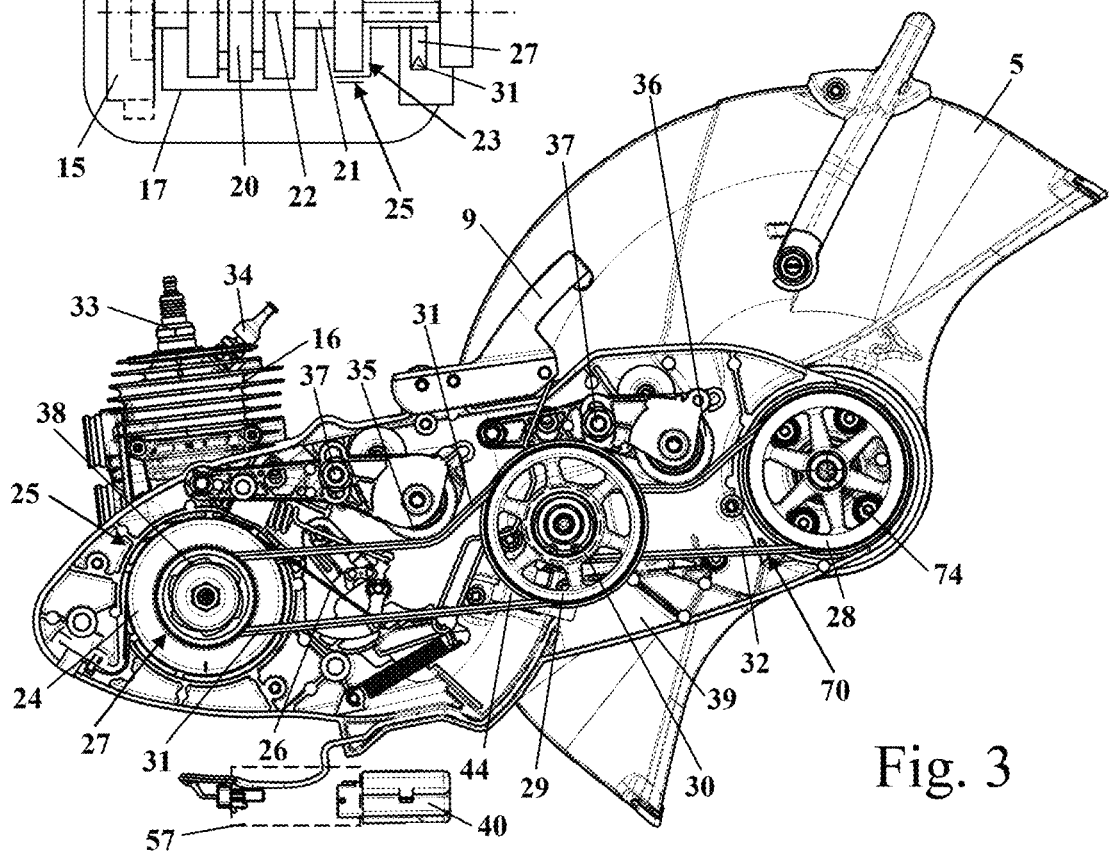
Fig. 3

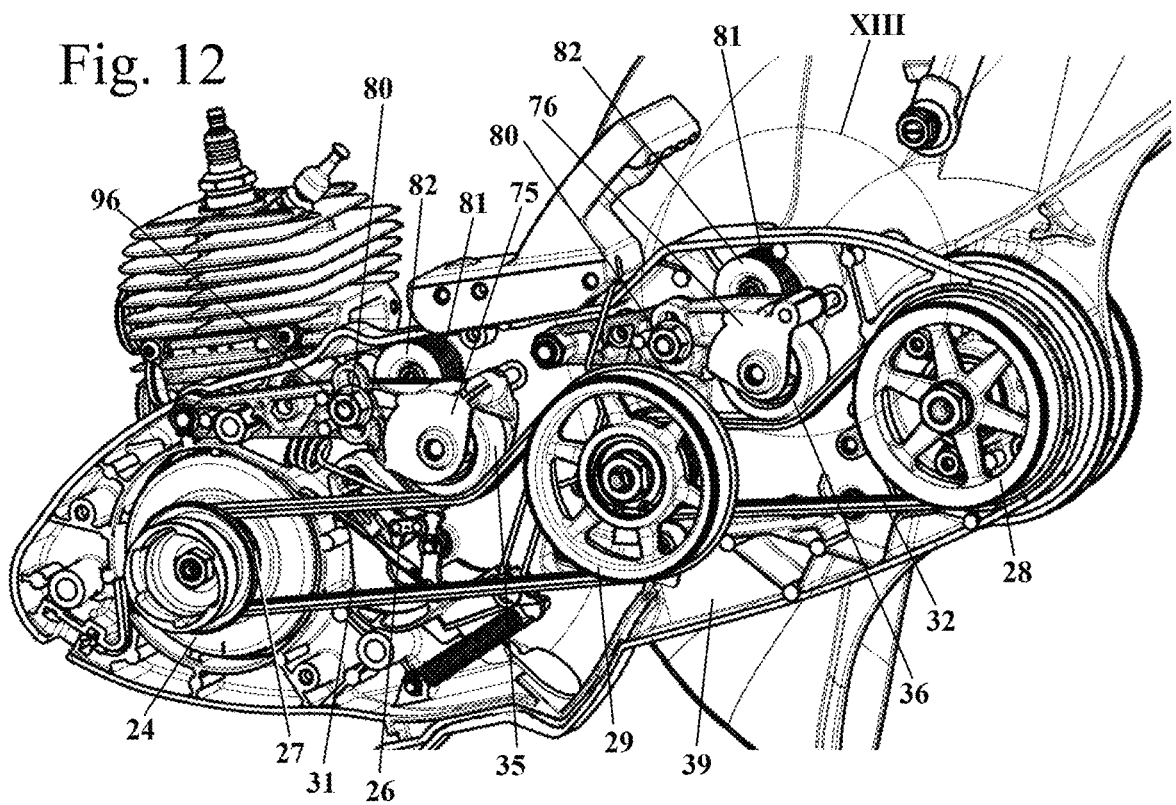
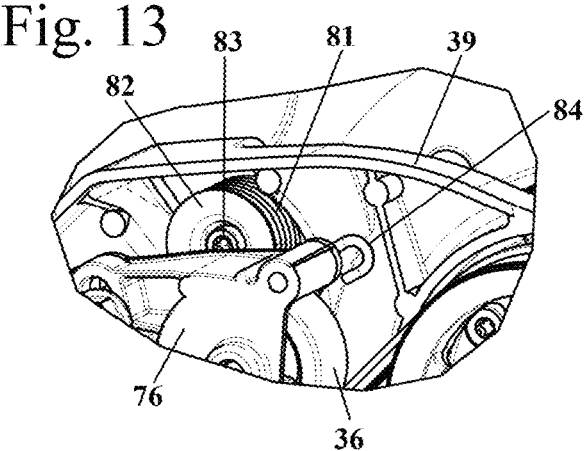
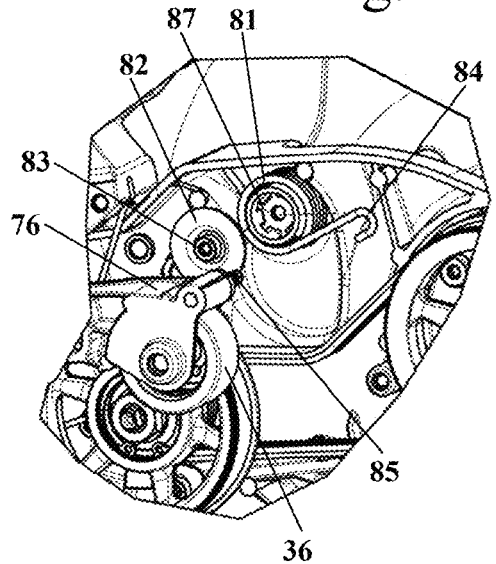
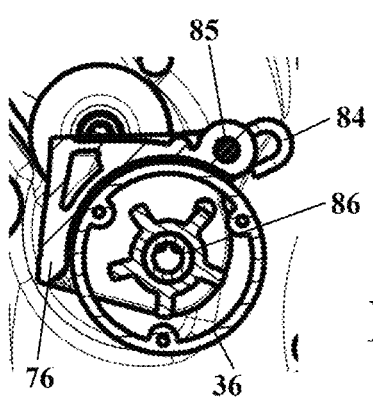

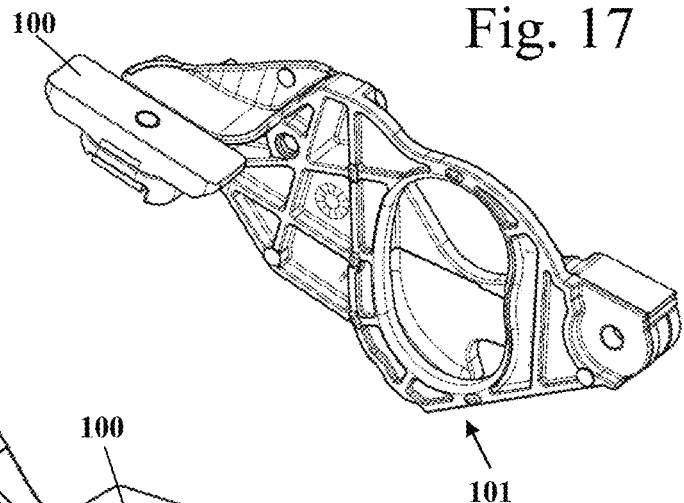
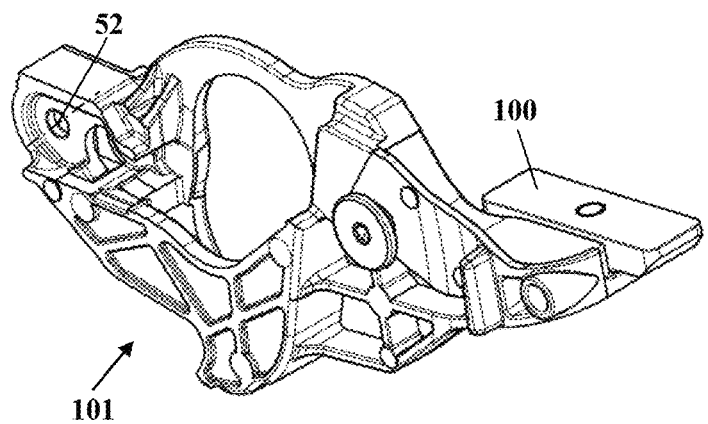
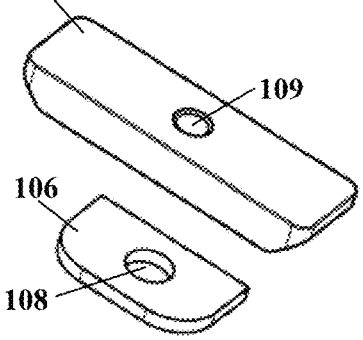
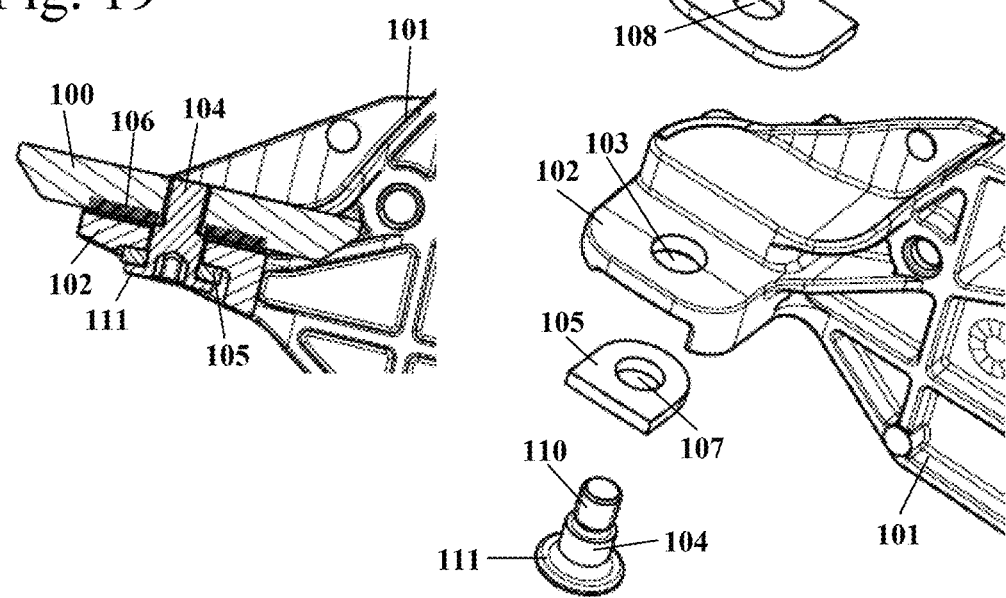

US 11,685,034 B2

HANDHELD WORK APPARATUS

CROSS REFERENCE TO RELATED APPLICATIONS

This application is a continuation-in-part application of U.S. patent application Ser. No. 15/361,291, filed Nov. 25, 2016 which, in turn, is a continuation application of international patent application PCT/EP2015/001007, filed May 15, 2015, designating the United States and claiming priority from German application 10 2014 007 878.7, filed May 24, 2014, and the entire content of the above applications is incorporated herein by reference.

BACKGROUND OF THE INVENTION

U.S. Pat. No. 6,039,037 has disclosed a cutting machine which is driven by internal combustion engine and the work tool of which is driven via a belt drive. Here, the diameter of the driving pulley is smaller for the two belts of the belt drive than the diameter of the driven pulley, with the result that the rotational speed of the work tool is lower than the rotational speed of the internal combustion engine.

A work apparatus is disclosed in U.S. Pat. No. 8,469,167. The work apparatus includes a brake unit which acts on the clutch drum. The brake unit is held in the release position during operation by the centrifugal weights of the centrifugal clutch. The brake unit can brake the work tool only when the coupling rotational speed is undershot.

U.S. Pat. No. 6,235,831 has disclosed a motorized cutting machine which is equipped with a dust collecting apparatus. The cut-off wheel of the cutting machine is driven via a two-stage belt drive. The first drive belt also drives an impeller wheel of the dust collecting apparatus. Redirection rolls are provided for guiding the drive belt.

United States patent application publication 2015/0258658 has disclosed a cut-off machine which has a brake unit with a belt brake.

EP 0 042 918 A1 has disclosed an electromechanical handheld power work tool which includes a band brake. The work tool is driven via a belt drive.

SUMMARY OF THE INVENTION

It is an object of the invention to provide a work apparatus which makes braking of the work tool possible independently of the rotational speed of the work tool.

It is provided that the brake unit acts on the belt drive of the work apparatus. Here, the brake unit can act on the belt drive directly or indirectly, for example via a clutch drum. The belt drive is coupled to the work tool independently of the rotational speed of the work tool, with the result that braking of the work tool is possible via the belt drive at every rotational speed. In particular at high rotational speeds and if the work tool is a work tool with a great moment of inertia, for example a cut-off wheel, high forces are required to brake the work tool. In order to reduce the required forces, it is provided that the work apparatus has at least one first drive belt of a first drive stage and a second drive belt of a second drive stage. The first and the second drive stage in each case bring about a reduction in the rotational speed. Accordingly, the rotational speed of the driven pulley of each drive belt is lower than the rotational speed of the driving pulley of the drive belt. A sufficiently large rotational speed reduction with an overall compact configuration can be achieved by way of the at least two-stage configuration of the belt drive. The reduction in the rotational speed of the work tool brings about a reduction in the inertia forces on the work tool, with the result that braking of the work tool via the belt drive is made possible. In order to achieve a reliable transmission of the braking force to the work tool, it is provided that at least one redirection roll bears against at least one drive belt. The tension in the drive belt is maintained via the redirection roll and lifting up of the drive belt from the pulley is avoided. As a result, the transmission of a sufficiently great braking moment to the work tool can be ensured. Here, the redirection roll advantageously enlarges the wraparound angle on at least one pulley, over which the at least one drive belt is guided. As a result, a rapid standstill of the work tool can be achieved by way of the brake unit.

At least one redirection roll bears against the drive belt, via which the highest drive moment is transmitted during operation. This is, in particular, the second drive belt which drives the second pulley which is connected fixedly to the work tool so as to rotate with it. As a result of the reduction in the rotational speed in every drive stage, the torque to be transmitted via the respective drive belt increases accordingly. In particular in the case of drive belts which transmit a high drive moment, lifting up of the drive belt from the pulley can be avoided in a simple way via the redirection roll.

A redirection roll advantageously bears against every drive belt. A compact construction of the work apparatus is made possible by way of the application of the belt tension via redirection rolls. The spacing of the rotational axis of the pulleys from one another can be fixed structurally and does not have to be variable in order to set the belt tension. Each redirection roll is advantageously arranged in such a way that an increase in the wraparound angle of the pulleys results.

The redirection rolls are advantageously arranged in such a way that, in the braking case, a redirection roll bears against the tight side of each drive belt which acts between the first and the second pulley. The redirection roll ensures that the brake force can be transmitted via the tight side in the braking case and prevents lifting up of the tight side from the pulley. As a result, the brake unit can be arranged in such a way that it acts on the driving, first pulley. The brake unit does not have to be arranged on the pulley, to which the work tool is connected, but rather can be arranged at a spacing from the work tool. This results in a simple construction. The tight side in the braking case is that side of each drive belt, via which the brake force is transmitted from the first pulley to the second pulley during the braking operation.

The redirection roll is advantageously held in a stationary manner during operation of the work apparatus. This ensures that the redirection roll cannot be pressed away during braking. The redirection roll is advantageously held in a stationary manner via a releasable fixation arrangement. When the fixation arrangement is released, the redirection roll is advantageously mounted in a pivotable and sprung manner. By virtue of the fact that the redirection roll is held in a stationary manner during operation, the spring can be configured in such a way that the desired belt tension results when the fixation arrangement is released. Therefore, the drive belt can be tensioned in a simple way by way of a release and, after the spring force has acted on the redirection roll and has tensioned the belt, renewed fixing of the fixation arrangement. The belt tension can be set without consideration of the forces which prevail on the redirection roll during the braking operation, since the redirection roll is held in a stationary manner in the braking case.

Each pulley of the belt drive is advantageously wrapped around by a drive belt of the belt drive over a wraparound angle of more than approximately 170°. In particular, each pulley of the belt drive is wrapped around by a drive belt of the belt drive over a wraparound angle of more than approximately 180°. This results in the high forces which can be transmitted, in particular in the braking case, with the result that the work tool can be braked. At least one pulley is advantageously wrapped around by a drive belt of the belt drive over a wraparound angle of more than 220°.

A simple construction results if the brake unit acts on the first pulley. As a result, the brake unit can be arranged at a spacing from the work tool, for example on the output side of a centrifugal clutch of the work apparatus.

In order to achieve a comparatively large reduction in the rotational speed of the work tool with respect to the drive motor and, as a result, comparatively low inertia forces which act on the work tool, the belt drive is of at least two-stage construction. The belt drive includes a first drive belt and a second drive belt, the first drive belt being guided over the first pulley and a third pulley, the third pulley being connected fixedly to a fourth pulley so as to rotate with it, and the second drive belt being guided over the fourth pulley. Here, the diameter of the fourth pulley is advantageously smaller than the diameter of the third pulley. One or more further drive belts can also be provided. On account of the redirection roll, the wraparound angle at every pulley can be kept comparatively great despite the different diameters of the pulleys. Here, the at least one redirection roll advantageously acts on the outer side of a drive belt and presses the drive belt inward in the direction of the other side of the belt, with the result that the wraparound angles on the drive pulleys are increased on account of the redirection of the drive belt on the redirection roll. The first pulley is preferably driven directly by the drive motor during operation. Accordingly, no further drive belt is arranged between the drive motor and the first pulley. Further elements, such as a clutch for example, can be arranged between the first pulley and the drive motor, however.

A simple construction of the brake unit results if the brake unit includes a brake band which acts on a brake drum, the brake drum being connected fixedly to the first pulley so as to rotate with it. In one particularly advantageous embodiment, the brake drum is the clutch drum of a centrifugal clutch of the work apparatus.

The brake unit advantageously has a brake position and a release position. The brake unit is advantageously held in the release position by a holding arrangement and is prestressed in the direction of the brake position by a triggering spring. Rapid triggering of the brake unit with low triggering forces is made possible by way of the prestress of the brake unit. The work apparatus advantageously has an actuating element, via which the brake unit can be adjusted out of the brake position into the release position. The actuating element can advantageously be actuated by the operator and can be, for example, an actuating lever or the like. During the adjustment of the brake unit out of the brake position into the release position, the triggering spring of the brake unit is advantageously stressed.

A simple construction results if the holding arrangement includes an electromagnet. This firstly ensures secure fixing of the brake unit in the release position. Secondly, the triggering of the brake unit can take place electronically. The work apparatus advantageously has a control unit and a sensor, the control unit causing a release of the holding arrangement if at least one triggering criterion which is determined by the sensor is present. The sensor is preferably a rotational speed sensor which determines the angular velocity of a movement of the work apparatus about an axis which is parallel to the rotational axis of the work tool. One triggering criterion is advantageously the exceeding of a predefined angular velocity about the axis. If the work apparatus moves in an impermissible manner, the movement can be detected via the rotational speed sensor and the brake unit can be triggered. In addition to the triggering criterion, further triggering criteria can be used.

The brake unit is advantageously triggered in a manner which is dependent on a rotational speed threshold, in particular if a rotational speed threshold is undershot.

It is advantageously provided that the rotational speed of the second pulley is at most 60% of the rotational speed of the first pulley. The work apparatus is preferably a cut-off machine and the work tool is a cut-off wheel. The rotational speed of the cut-off wheel is, in particular, less than approximately 4000 revolutions per minute. The rotational speed of the cut-off wheel is advantageously less than approximately 3000 revolutions per minute. This results in a comparatively low moment of inertia of the cut-off wheel during operation, with the result that a sufficiently great braking force can be transmitted to the cut-off wheel via the belt drive.

BRIEF DESCRIPTION OF THE DRAWINGS

The invention will now be described with reference to the drawings wherein:

FIG. 1 shows a side view of a cut-off machine;

FIG. 2 is a diagrammatic sectional illustration of the cut-off machine from FIG. 1;

FIG. 3 shows a side view of the cantilever of the cut-off machine from FIG. 1 with a removed cover and with a drive motor arranged thereon and with a protective cover arranged thereon;

FIG. 12 is a perspective illustration of the arrangement from FIG. 3;

FIG. 13 shows the detail XIII of FIG. 12 in an enlarged illustration;

FIG. 14 shows the arrangement from FIG. 13 in an exploded illustration;

FIG. 15 shows a section through the redirection roll from FIG. 13;

FIGS. 16 and 17 are perspective illustrations of an embodiment of a triggering lever of a cut-off machine;

FIG. 18 is an exploded illustration of the triggering lever in the region of the retaining plate; and, FIG. 19 shows a sectional illustration through the region of the retaining plate of the triggering lever.

DESCRIPTION OF THE PREFERRED EMBODIMENTS OF THE INVENTION

Figure 4:
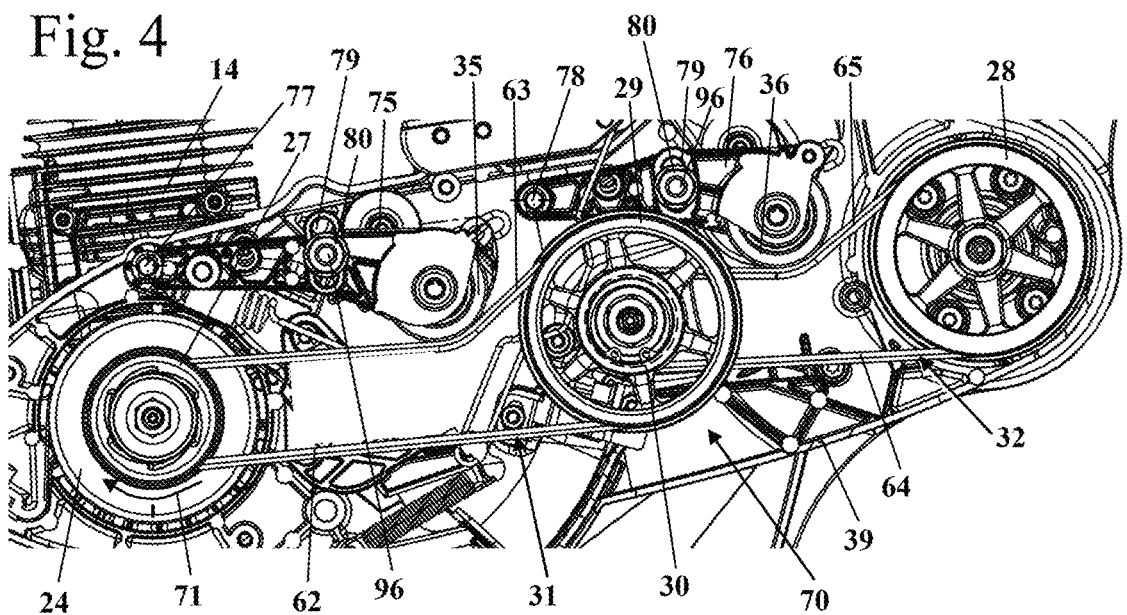
FIG. 4 and FIG. 5 show a detail from FIG. 3 which shows the belt drive.

FIG. 1 shows a cut-off machine 1 as an example of an embodiment for a handheld work apparatus. The cut-off machine 1 has a housing 2, on which a cantilever 3 is fixed. A work tool 4, namely a cut-off wheel, is mounted rotatably at the free end of the cantilever 3. During operation, the work tool 4 is driven so as to rotate in a rotational direction 10. The work tool 4 is covered over part of its circumference by a protective cover 5 which, in the embodiment, is configured in one piece with a housing part 39 (FIG. 3) of the cantilever 3. The protective cover 5 and the housing part 39 of the cantilever 3 can, for example, be made of metal and can be manufactured in a casting process. The cantilever 3 includes a cover 88 which closes the housing part 39. An actuating element 9 is arranged on the cantilever 3. The actuating element 9 is configured as an actuating lever in the embodiment and serves to actuate a brake unit which will be described in greater detail in the following text.

A handle 6 is arranged on the housing 2. The handle 6 is configured as a rear handle in the embodiment and is arranged on that side of the housing 2 which faces away from the work tool 4. The cantilever 3 protrudes forward on that side of the housing 2 which faces away from the handle 6. A throttle lever 11 and a throttle lever lock 12 are mounted pivotably on the handle 6. Moreover, a bale handle 7 is fixed on the housing 2. The bale handle 7 engages over the housing 2 on that side of the housing 2 which faces the work tool 4. The cut-off machine 1 has a starter arrangement 8 for a drive motor 14 (FIG. 2). A starter handle 13 which protrudes out of the housing 2 serves to actuate the starter arrangement 8.

FIG. 2 shows the construction of the drive of the cut-off machine 1 in greater detail. The drive motor 14 is configured as an internal combustion engine and has a cylinder 16, in which a combustion chamber 19 is formed. The drive motor 14 is configured as a single-cylinder engine. The combustion chamber 19 is delimited by a piston 18 which, via a connecting rod 20, drives a crankshaft 21 in a rotating manner. The crankshaft 21 is mounted in a crankcase 17 such that it can be rotated about a rotational axis 22. A flywheel 15 is fixed on the crankshaft 21. The flywheel 15 can be configured as an impeller wheel and can serve to deliver cooling air. A centrifugal clutch 23 is arranged on that side of the drive motor 14 which faces away from the flywheel 15. The centrifugal clutch 23 includes a clutch drum which serves as a brake drum 24 for a brake unit 25. A brake band 26 is arranged on the outer circumference of the brake drum 24. A first pulley 27 of a belt drive 70 (FIG. 3) is connected fixedly to the brake drum 24 so as to rotate with it. A first drive belt 31 is held on the first pulley 27. The starter arrangement 8 is connected fixedly to the crankshaft 21 so as to rotate with it and is arranged on that side of the first pulley 27 which faces away from the centrifugal clutch 23. In the embodiment, the drive motor 14 is a two-stroke engine. However, the drive motor 14 can also be a four-stroke engine.

FIG. 3 shows the construction of the belt drive 70 in detail. The belt drive 70 includes the first pulley 27 and a second pulley 28. The second pulley 28 is connected fixedly to the work tool 4 so as to rotate with it and is mounted such that it can be rotated about a rotational axis 74. The rotational axis 74 is the rotational axis of the work tool 4. The first drive belt 31 is guided over the first pulley 27 and the third pulley 29. Together with the first pulley 27 and the third pulley 29, the first drive belt 31 forms a first drive stage. A fourth pulley 30 (shown diagrammatically in FIG. 3) is connected fixedly to the third pulley 29 so as to rotate with it. A second drive belt 32 is guided over the fourth pulley 30 and the second pulley 28. Together with the fourth pulley 30 and the second pulley 28, the second drive belt 32 forms a second drive stage. A first redirection roll 35 bears against the first drive belt 31. The position of the first redirection roll 35 can be fixed via a fixation arrangement 37. A redirection roll 36 bears against the second drive belt 32, the position of which redirection roll 36 can likewise be fixed via a fixation arrangement 37. As FIG. 3 also shows, an engagement contour 38 for the starter arrangement 8 is connected fixedly to the brake drum 24 so as to rotate with it. A spark plug 33 and a decompression valve 34 are arranged on the cylinder 16. As FIG. 3 also shows, the cut-off machine 1 has a rotational speed sensor 40 which is connected to a control unit 57. An electromagnet 44 which will be described in greater detail in the following text is also connected to the control unit 57.

FIG. 4 shows the drive belt 70 in the drive case. The brake drum 24 is driven by the drive motor 14 in the direction of the arrow 71. The drive force is transferred to the third pulley 29 via a tight side 62 of the first drive belt 31. The other side (shown at the top in FIG. 4) of the drive belt 31 is the slack side 63 in the drive case. The redirection roll 35 bears against the slack side 63 in the drive case. The second drive belt 32 has a tight side 64, by which the drive force is transmitted from the fourth pulley 30 to the second pulley 28. The other side (likewise shown at the top in FIG. 4) of the second drive belt 32 is the slack side 65, against which the redirection roll 36 bears.

As FIG. 4 shows, the first redirection roll 35 is mounted on the housing part 39 such that it can be pivoted about a pivot axis 77 on a pivot lever 75. The pivot lever 75 has a slot 79, through which a bolt 96 protrudes, onto which a nut 80 is screwed. Together with the bolt 96, the nut 80 forms the fixation arrangement 37 (FIG. 3).

The second redirection roll 36 is mounted on a corresponding pivot lever 76 which is mounted on the housing part 39 such that it can be pivoted about a pivot axis 78. The pivot lever 76 likewise has a slot 79, through which a bolt 96 protrudes, onto which a nut 80 is screwed, and, together with the latter, forms the fixation arrangement 37 (FIG. 3) of the redirection roll 36.

Figure 5:
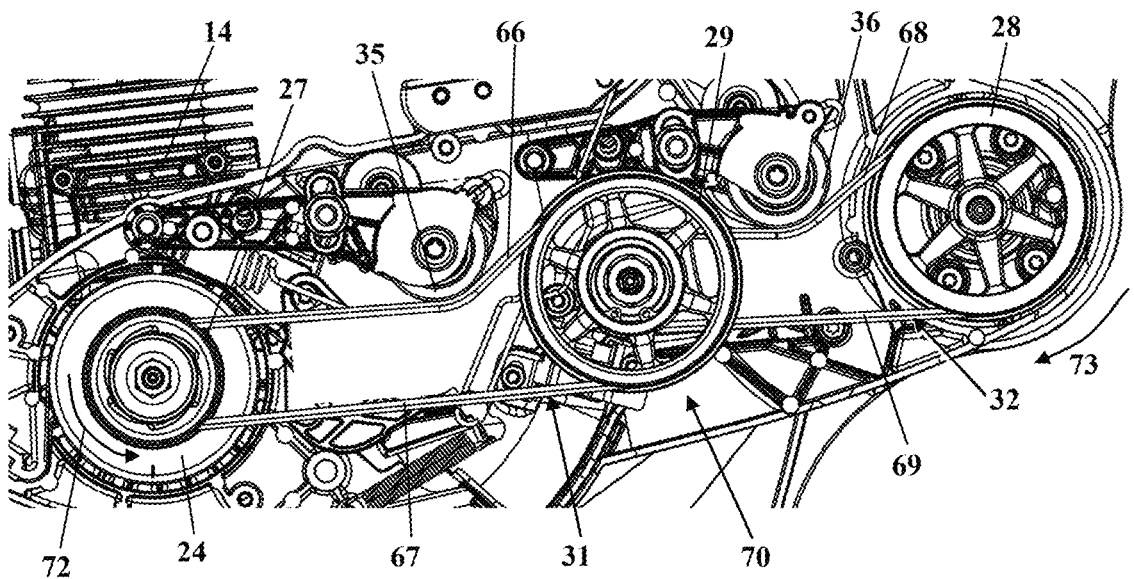

FIG. 5 shows the arrangement in the braking case. The brake force which is applied by the brake band 26 (FIG. 3) acts on the brake drum 24 in the direction of the arrow 72. The tight side 62 of the drive case is the slack side 67 in the braking case. The slack side 63 in the drive case is the tight side 66 in the braking case, against which tight side 66 the redirection roll 35 bears. Accordingly, the tight side 64 of the second drive belt 32 is the slack side 69 in the braking case, and the slack side 65 in the drive case is the tight side 68 in the braking case. The redirection roll 36 bears against the tight side 68 in the braking case. The inertial force of the work tool 4 acts in the direction of the arrow 73 on the second pulley 28. The arrow 73 points in the rotational direction 10 of the work tool 4 (FIG. 1).

Figure 6:
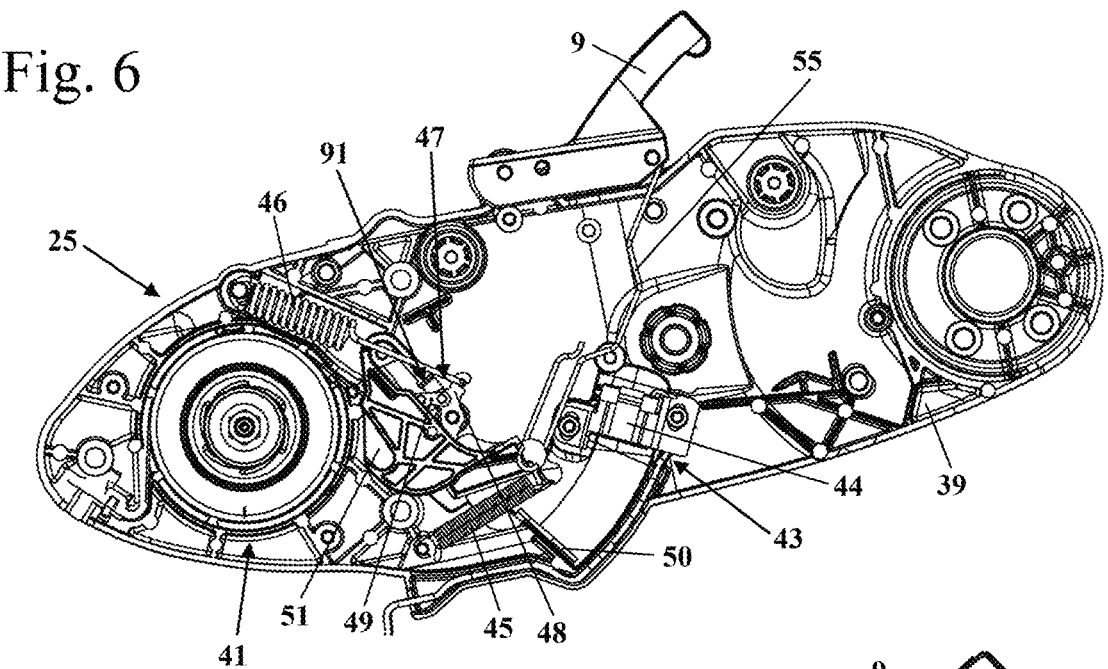
FIG. 6 shows a side view of the brake unit on the cantilever in the brake position.
Figure 7:
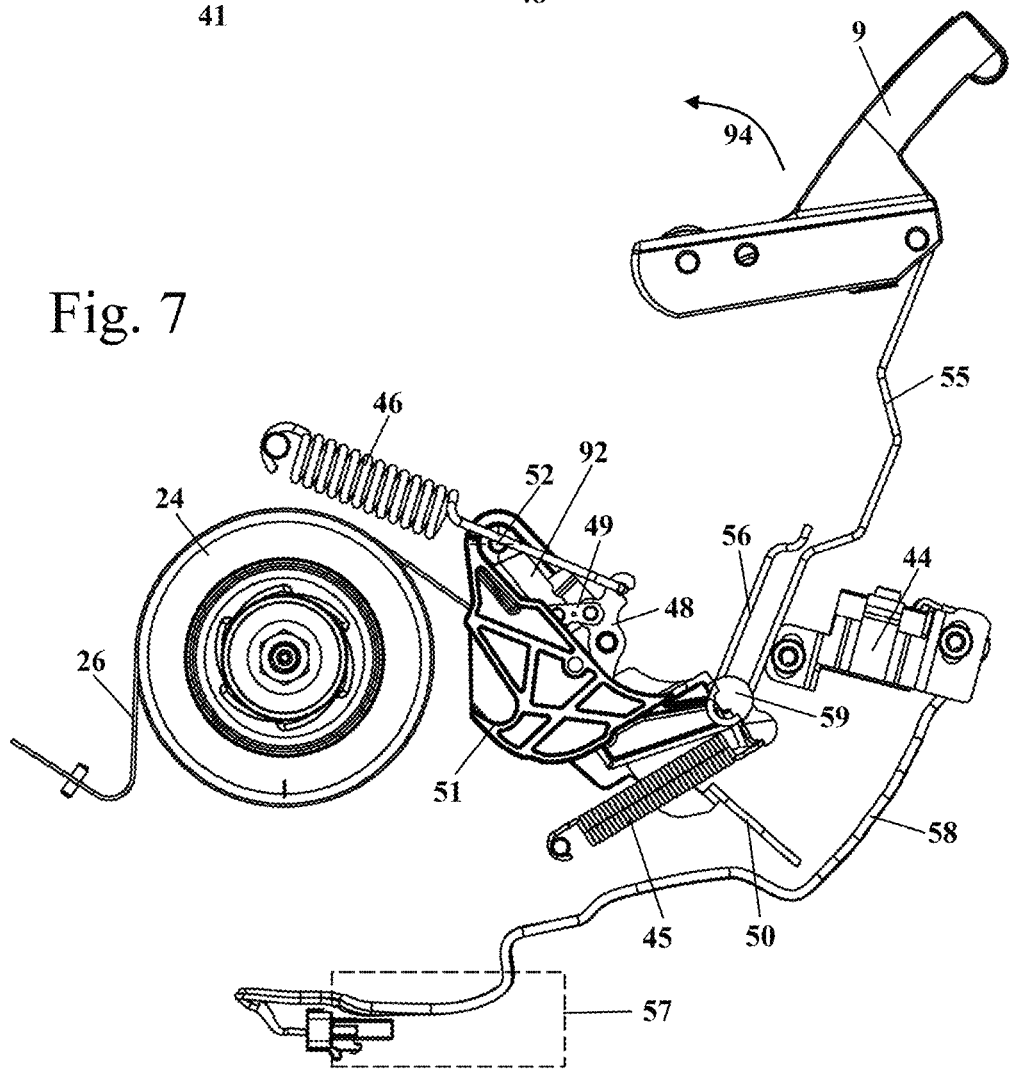
FIG. 7 shows a side view of the brake unit in the brake position without the cantilever.
Figure 8:
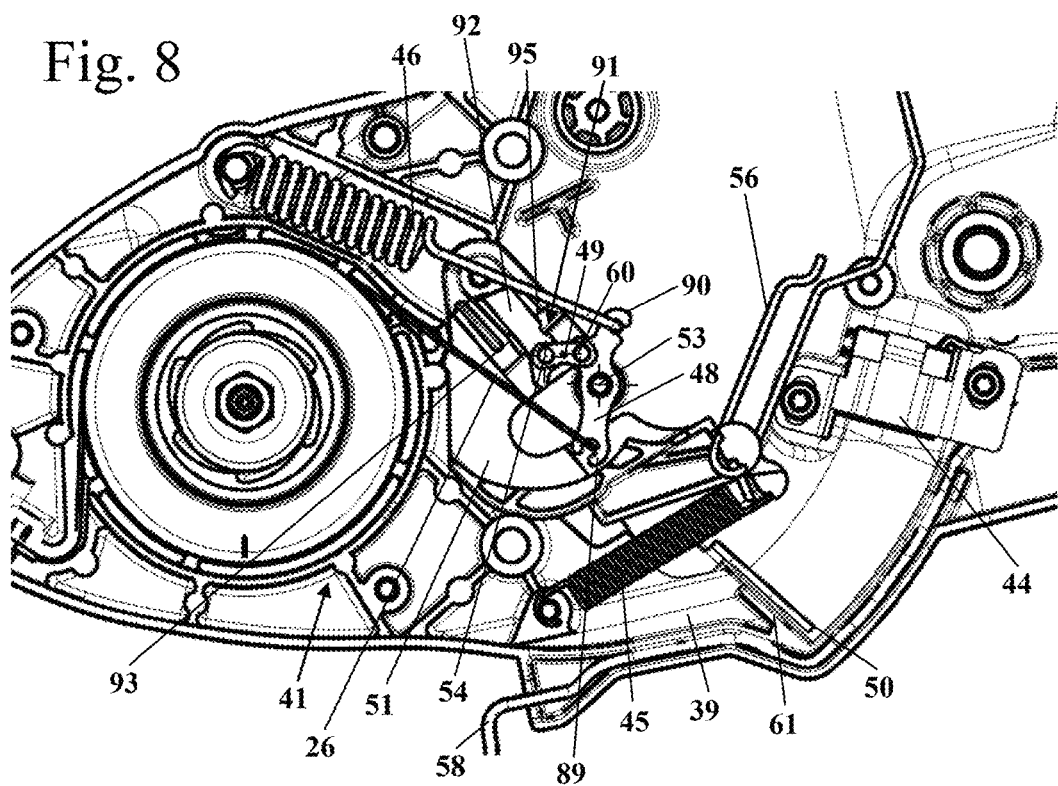
FIG. 8 shows a detail from FIG. 7 with a partially sectioned triggering lever.
Figure 9:
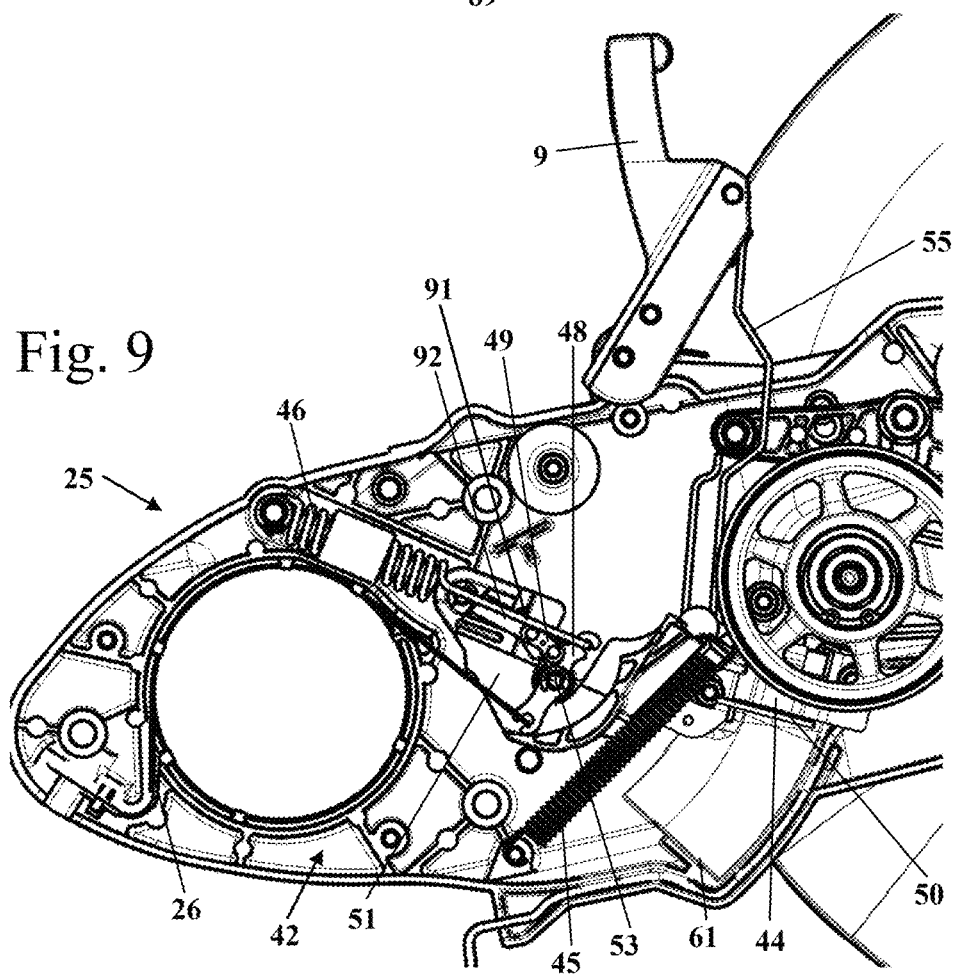
FIG. 9 shows the arrangement from FIG. 8 in the release position.

FIGS. 6 to 9 show the brake unit 25 in detail. FIGS. 6 to 8 show the brake unit 25 in its brake position 41. In the position, the brake band 26 (FIG. 7) is pulled fixedly around the outer circumference of the brake drum 24 and, as a result, brakes the brake drum 24 and the belt drive 70. The brake unit 25 has a lever arrangement 47 which includes a lever 48, a triggering lever 51 and a toggle lever 91. The toggle lever 91 has a first articulated lever 49 and a second articulated lever 92. As FIG. 8 shows, the lever 48 is mounted on the first housing part 39 about a pivot axis 53. The brake band 26 is held at a first end 89 of the lever 48. A brake spring 46 which prestresses the brake unit 25 in the direction of the brake position 41 acts at a second end 90 of the lever 48. The triggering lever 51 is held on the housing part 39 (FIG. 6) such that it can be pivoted about a pivot axis 52 which is shown in FIG. 7. As FIG. 8 shows, the first articulated lever 49 is mounted on the second articulated lever 92 such that it can be pivoted about a pivot axis 54. The second articulated lever 92 is held with play on the triggering lever 51 and can be pivoted slightly about the pivot axis 52 of the triggering lever 51 for tolerance compensation. Here, the second articulated lever 92 is held between actuating contours 93 and 95 of the triggering lever 51. The second end of the first articulated lever 49 is fixed on the lever 48 such that it can be pivoted about a pivot axis 60. The triggering lever 51 is prestressed in the direction of the brake position 41 via a triggering spring 45 which is shown in FIG. 8. The triggering lever 51 has a retaining plate 50 which interacts with an electromagnet 44 in the release position 42 of the brake unit 25. Together with the retaining plate 50, the electromagnet 44 forms a holding arrangement 43 which holds the brake unit 25 in its release position 42 (FIG. 9). Moreover, a coupling element 55 (shown in FIG. 6) acts on the triggering lever 51. The coupling element 55 is connected to the actuating element 9.

As FIG. 7 shows, the coupling element 55 includes a longitudinal guide 56. The triggering lever 51 is guided with a bearing element 59 in the longitudinal guide 56. If the actuating element 9 is pivoted out of the position which is shown in FIG. 7 in the direction of the arrow 94 into the position which is shown in FIG. 9, the coupling element 55 drives the triggering lever 51 on the bearing element 59 and pivots the lever about the pivot axis 52 (FIG. 7). Here, the triggering spring 45 and the brake spring 46 are stressed. The retaining plate 50 passes onto the electromagnet 44. The electromagnet 44 is energized during operation of the cut-off machine 1 and holds the magnetic retaining plate 50 as a result. As a result, the brake unit 25 is held in its release position 42 which is shown in FIG. 9.

The energy for energizing the electromagnet 44 is generated during operation on account of the rotation of the crankshaft 21. For this purpose, the crankshaft 21 is advantageously fixedly connected with the generator 155 so as to cause the generator and crankshaft to rotate together. In the embodiment shown, the generator 155 is mounted on the flywheel 15 which is fixed on the crankshaft to rotate therewith. The generator 155 is connected to the control unit 57 and to the electromagnet 44. When the crankshaft 21 rotates, the generator 155 makes the energy available for supplying current to the electromagnet 44. The amount of electrical energy made available is dependent upon the rotational speed of the crankshaft 21.

If the rotational speed of the drive motor 14 and therefore also of the crankshaft 21 falls below a structurally predefined rotational speed, the energy of the electromagnet 44 is no longer sufficient to hold the retaining plate 50. The triggering lever 51 is pivoted by the triggering spring 45, and the brake unit 25 is moved into its brake position 41. At a standstill of the drive motor 14, the brake unit 25 is in its brake position 41 as a result. Further energy store devices 150 can be provided which supply the electromagnet 44 with energy. The arrangement of the additional energy store device 150 is shown in FIG. 7. As a result, the rotational speed, upon the undershooting of which the brake unit 25 is adjusted into its brake position 41, can be shifted toward lower rotational speeds. The additional energy store devices 150 can be, for example, batteries 161, capacitors 162, a mechanical flywheel mass 160 or the like as shown schematically in FIG. 2.

The capacitor 162 is mounted especially in an ignition module 163 of the drive motor 14. The ignition module 163 triggers an ignition spark in the combustion chamber 19 and controls the ignition time point. The mechanical flywheel mass 160 can advantageously be configured as an additional flywheel mass of an already present flywheel 150. However, also another arrangement and configuration of the additional mechanical flywheel mass 160 can be advantageous.

As FIGS. 8 and 9 show, the triggering lever 51 pivots about the pivot axis 52 during pivoting out of the brake position 41 (FIG. 8) into the release position 42 (FIG. 9). Here, the triggering lever 51 drives the second articulated lever 92 via the actuating contour 93. Here, the dead center of the toggle lever 91 is overcome. During the pivoting of the lever 48, the brake spring 46 is stressed and the brake band 26 is released.

In order to trigger the brake unit, the current supply to the electromagnet 44 is interrupted or the energy which is provided to the electromagnet 44 drops because of a decreasing rotational speed below a structurally predefined threshold. As a result, the retaining plate 50 is no longer held on the electromagnet 44. The triggering lever 51 is pivoted on account of the prestress of the triggering spring 45. The triggering lever 51 drives the second articulated lever 92 via the actuating contour 95 and, as a result, adjusts the toggle lever 91 via its dead center position into a position, in which the brake spring 46 acts on the lever 48. On account of the force of the brake spring 46, the lever 48 pivots and in the process stresses the brake band 26. As a result, the arrangement can be held in the release position 42 by way of low force, and only a low force is required on the triggering lever 51 in order to trigger the braking operation. The triggering spring 45 merely has to pivot the triggering lever 51 until the dead center of the toggle lever 91 is overcome. For this purpose, only a low force and a low spring travel are required. A leg spring can also be provided, for example, as triggering spring 45. The braking force itself is applied by the prestressed brake spring 46.

As FIGS. 8 and 9 also show, a stop 61 for the triggering lever 51 is configured on the housing part 39. The stop 61 is advantageously configured from an elastic material and serves to cushion the retaining plate 50 into the brake position 41 during adjustment of the brake unit 25. It can also be provided to provide a stop for the triggering lever 51 as an alternative. Here, the stop made from elastic material can be provided on the housing part 39 and/or on the triggering lever 51 or on the retaining plate 50.

On account of the decoupling of the position of the actuating element 9 from the position of the bearing element 59 via the longitudinal guide 56, the actuating element 9 can be pivoted back after pivoting in the direction of the arrow 94 in FIG. 7, that is, after adjusting the brake unit 25 from the release position 42 into the brake position 41. Here, the brake unit 25 is held in the brake position 41 which is shown in FIG. 9 by the holding arrangement 43.

It is provided during operation of the cut-off machine 1 that the operator adjusts the brake unit into the release position 42 before beginning work with the cut-off machine. As FIG. 7 shows, the electromagnet 44 is connected via a connecting line 58 to the control unit 57 which is also connected to the rotational speed sensor 40 according to FIG. 3. The rotational speed sensor 40 determines the angular velocity of a movement of the work apparatus about an axis which is parallel to the rotational axis 74 of the work tool 4. As soon as a predefined angular velocity about the axis is exceeded and is detected by the control unit 57 on the basis of the values which are supplied by the rotational speed sensor 40, the control unit 57 triggers the brake unit 25 by interrupting the power supply to the electromagnet 44. This brings about a release of the holding arrangement 43. When the holding arrangement 43 is released, the triggering spring 45 and the brake spring 46 adjust the brake unit 25 into the brake position 41 and brake the brake drum 24. The work tool 4 is braked via the drive belts 31 and 32. If the rotational speed of the drive motor 14 falls below a structurally predefined rotational speed threshold, the energy of the electromagnet 44 is no longer sufficient to hold the brake unit 25 in the release position 42, and the brake unit 25 is adjusted into its brake position 41.

Figure 10:
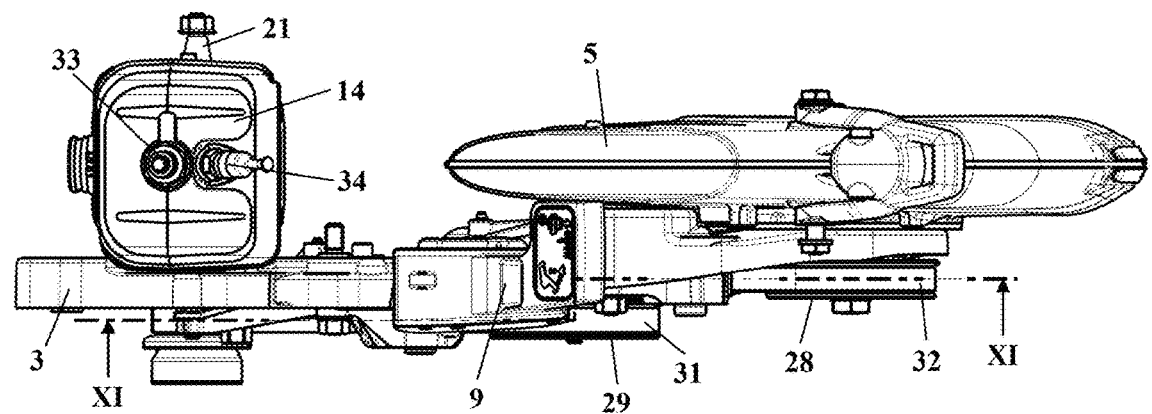
FIG. 10 shows a plan view of the arrangement of FIG. 3.
Figure 11:
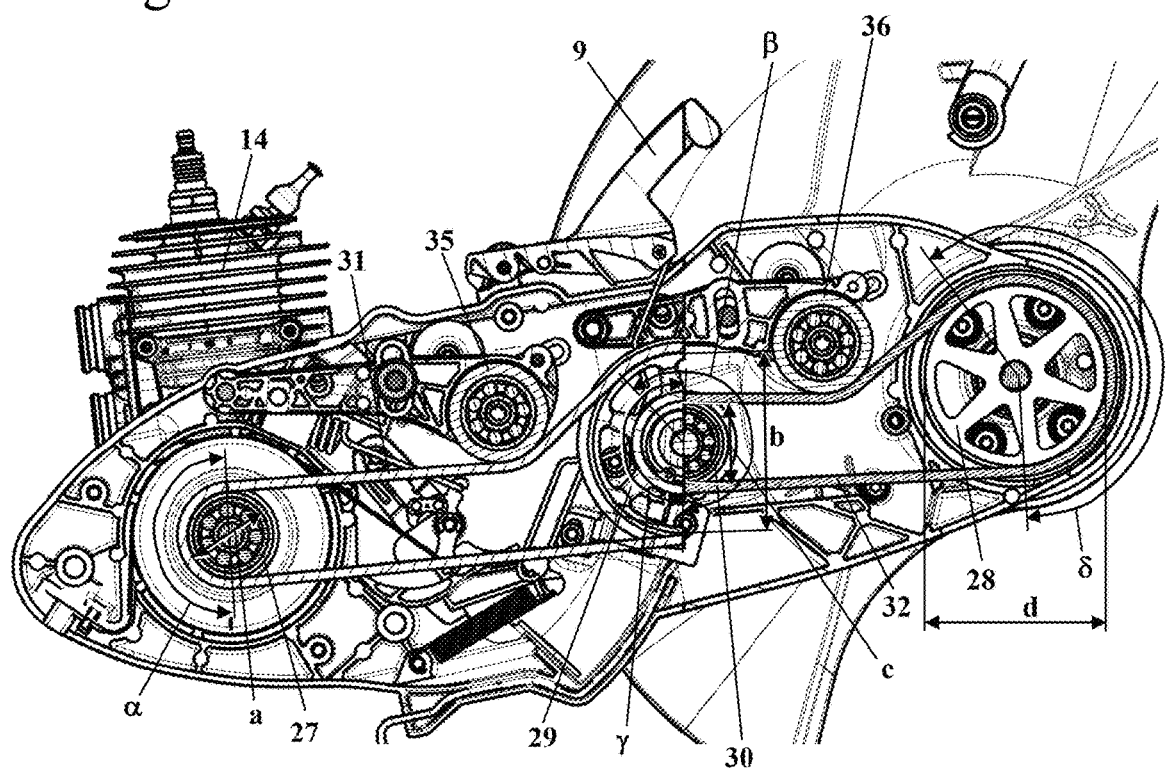
FIG. 11 shows a section along the line XI-XI of FIG. 10.

The sectional illustration in FIG. 11 which shows the section shown in FIG. 10 through the belt drive 70 shows the diameters and wraparound angles on the pulleys 27 to 30. The first pulley 27 has a diameter (a) and is wrapped around by the first drive belt 31 over a wraparound angle α which is advantageously at least approximately 170°, in particular more than approximately 180°. In the embodiment, the wraparound angle α is approximately 180°. The third pulley 29 has a diameter (b) which is considerably greater than the diameter (a) of the first pulley 27. The third pulley 29 is wrapped around by the first drive belt 31 over a wraparound angle β which is advantageously more than approximately 170°, in particular more than approximately 180°. The wraparound angle β is preferably at least approximately 220°.

The fourth pulley 30 has a diameter (c) which is considerably smaller than the diameter (b) of the third pulley 29. The diameter (b) can be, for example twice, preferably at least 2.5 times the diameter (c). The fourth pulley 30 is wrapped around by the second drive belt 32 over a wraparound angle Y which is advantageously at least approximately 170°, in particular at least approximately 180°.

The second pulley 28 has a diameter (d) which can preferably correspond approximately to the diameter (b) of the third pulley 29. The diameter (d) is considerably greater than the diameter (c) of the fourth pulley 30. The diameter (d) can be, for example, at least twice, preferably at least 2.5 times the diameter (c). The second pulley 28 is wrapped around by the second drive belt 32 over a wraparound angle δ which is advantageously more than approximately 180°, in particular at least approximately 220°. The comparatively large wraparound angles Y and δ are achieved on account of the redirection rolls 35 and 36. It is achieved on account of the different diameters of the pulleys 28 to 30 that the rotational speed of the second pulley 28 is considerably lower than the rotational speed of the first pulley 27. The rotational speed of the second pulley 28 is advantageously at most approximately 60% of the rotational speed of the first pulley 27. The rotational speed of the work tool 4, namely of the cut-off wheel of the cut-off machine 1, is advantageously less than approximately 4000 revolutions per minute, preferably less than approximately 3000 revolutions per minute. On account of the lower rotational speed of the second pulley 28, the torque which is transmitted to the second pulley 29 is considerably greater than the torque which is transmitted from the first pulley 27 to the first drive belt 31. A redirection roll 36 on the drive belt 32 is advantageous, in particular, on the second drive stage.

FIGS. 12 to 15 show the configuration and mounting of the redirection rolls 35 and 36 in detail. The two pivot levers 75 and 76 are advantageously of identical configurations. A spring 81 is mounted on the housing part 39 adjacently with respect to each redirection roll 35, 36. The spring 81 is configured in the embodiment as a torsion spring. The spring 81 is covered on its end side by a retaining plate 82 and is fixed axially as a result. As FIG. 13 shows, the retaining plate 82 is fixed on the housing part 39 by way of an attachment screw 83. The spring 81 has one end 84 which acts on the pivot lever 76. As FIG. 14 shows, a lug 85 is held on the pivot lever 76, on which lug 85 the end 84 of the spring 81 acts. The spring 81 is held on a bearing support 87 of the housing part 39. As FIG. 15 shows, the redirection roll 36 is mounted on the pivot lever 76 such that it can be rotated on a bearing pin 86. The second end of the spring 81 is supported on the housing part 39. The mounting of the redirection roll 35 on the pivot lever 75 is configured in a corresponding manner to the mounting of the redirection roll 36.

In order to tension the drive belt 31 and 32, the nuts 80 on the pivot levers 75 and 76 are released. As a result, in each case one spring 81 acts via a lug 85 on the pivot lever 75 and the pivot lever 76 which, as a result, is pressed with the predefined force against the drive belts 31 and 32. Subsequently, the nuts 80 are fixed, with the result that the pivot lever 75 and 76 are held on the housing part 39 in a stationary manner. During the braking operation, the redirection rolls 35 and 36 bear against the tight side 66 and 68 of the drive belts 31, 32. By virtue of the fact that the redirection rolls are held on the housing part 39 in a stationary manner, sufficiently great forces can be transmitted to the work tool 4 via the belt drive 70.

In the embodiment, the brake unit 25 acts on the first pulley 27. However, it can also be provided that the brake unit 25 acts on the fourth pulley 30. The fourth pulley 30 is also a driving pulley. The arrangement of a brake unit 25 on the fourth pulley 30 results in a simple construction, since the brake unit 25 does not have to be arranged on the driven pulley 28, that is, not in the immediate spatial vicinity of the work tool 4.

FIGS. 16 to 18 show one embodiment of a triggering lever 101 for the brake unit 25. The construction of the triggering lever 101 corresponds substantially to that of the triggering lever 51. The triggering lever 101 is mounted such that it can be pivoted about a pivot axis 52. A retaining plate 100 is fixed on the triggering lever 101. The retaining plate 100 can be moved slightly, in particular can be tilted, in order to compensate for tolerances with respect to the triggering lever 101. This can ensure that the retaining plate 100 can bear flatly against the electromagnet 44, as a result of which a sufficiently high holding force is ensured.

FIGS. 18 and 19 show the movable mounting of the retaining plate 100 in detail. As FIG. 18 shows, the triggering lever 101 has a fixation region 102, on which the retaining plate 100 is fixed. An attachment opening 103 extends through the fixation region 102, through which attachment opening 103 an attachment screw 104 protrudes. In the embodiment, the attachment screw 104 is screwed into the retaining plate 100. To this end, the attachment screw 104 has a thread section 110 which is screwed into an attachment opening 109 of the retaining plate 100. The attachment opening 109 is provided with an internal thread. A damping element 105 is arranged between the head 111 of the attachment screw 104 and the fixation region 102. The damping element 105 has an attachment opening 107, through which the attachment screw 104 protrudes. A further damping element 106 is arranged between the fixation region 102 and the retaining plate 100. The further damping element 106 has an attachment opening 108, through which the attachment screw 104 protrudes. The damping elements 105 and 106 can be made of an elastic material and are configured as flat plates in the embodiment.

FIG. 19 shows the construction in the assembled state. The damping element 105 is arranged between the head 111 of the attachment screw 104 and the fixation region 102, and the retaining plate 100 is arranged on the opposite side of the fixation region 102. The damping element 106 is arranged between the fixation region 102 and the retaining plate 100 and, in the embodiment, protrudes into a depression of the retaining plate 100. Here, the arrangement is such that the retaining plate 100 can be moved slightly, in particular can be tilted about its longitudinal axis and its transverse axis, with respect to the fixation region 102 of the triggering lever 101. As a result, tolerances between the retaining plate 100 and the electromagnet 44 can be compensated for, and the retaining plate 100 can bear flatly against the electromagnet 44.

Other configurations for compensating for the tolerances between the retaining plate (50, 100) and the electromagnet 44 can also be expedient.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   a work tool;
   a belt drive;
   a drive motor configured to drive said work tool via said belt drive;
   a brake unit configured to act on said belt drive;
   a holding arrangement;
   said brake unit having a braking position and a released position;
   said holding arrangement being configured to hold said brake unit in said released position;
   said holding arrangement including an electromagnet;
   a power source to supply current to said electromagnet during operation of said work apparatus;
   said drive motor being a combustion engine having a crankshaft;
   said power source being operatively connected to said crankshaft so as to generate said current in response to the rotation thereof;
   an additional power source to supply current to said electromagnet;
   wherein said work apparatus has a first threshold rotational speed of said combustion engine whereat said brake unit is shifted into said braking position when the rotational speed of said engine drops below said first threshold rotational speed absent said additional power source; and,
   said additional power source is configured to provide a second threshold rotational speed lower than said first threshold rotational speed causing said brake unit to shift into said braking position when the rotational speed of said combustion engine drops below said second threshold rotational speed.

2. The handheld work apparatus of claim 1, wherein said additional power source includes a capacitor, a battery and/or a flywheel mass.

3. The handheld work apparatus of claim 1, wherein said brake unit is shifted into said braking position when said current of said electromagnet is no longer adequate to hold said brake unit in said released position.

4. The handheld work apparatus of claim 3, wherein:
   said brake unit includes a holding plate for coacting with said electromagnet to hold said brake unit in said released position;
   said combustion engine has a first threshold rotational speed whereat the current supplied to said electromagnet is no longer sufficient to hold said holding plate; and,
   said combustion engine has a second threshold rotational speed lower than said first threshold rotational speed whereat said brake unit is shifted into said braking position when the current to energize the electromagnet which is generated because of the rotation of the crankshaft is not stored in said additional power source.

5. The handheld work apparatus of claim 1 further comprising a battery for supplying current to said electromagnet from time to time.

6. The handheld work apparatus of claim 1, wherein said brake unit includes a trigger spring pretensioned in a direction toward said braking position.

7. The handheld work apparatus of claim 1, wherein said belt drive comprises:
   a first belt pulley; a second belt pulley; a third belt pulley and a fourth belt pulley;
   a first drive belt guided over said first belt pulley and said third belt pulley;
   said third belt pulley being fixedly connected to said fourth belt pulley so as to rotate therewith; and,
   a second drive belt guided over said fourth belt pulley.

8. The handheld work apparatus of claim 7, wherein said first belt pulley is driven by said drive motor.

9. The handheld work apparatus of claim 7, wherein the rotational speed of said second belt pulley is at most 60% of the rotational speed of said first belt pulley.

10. The handheld work apparatus of claim 8, wherein said brake unit includes a brake drum and a brake band which acts on said brake drum; and, said brake drum is fixedly connected to said first belt pulley so as to rotate therewith.

11. The handheld work apparatus of claim 1 further comprising an actuating element configured to shift said brake unit out of said braking position into said released position.

12. The handheld work apparatus of claim 7 further comprising:
   a sensor for detecting at least one triggering criterion; and,
   a control unit operatively connected to said sensor and configured to cause a release of said holding arrangement in response to a presence of said triggering criterion.

13. The handheld work apparatus of claim 12, wherein said sensor is a rotational speed sensor; said rotational speed sensor detects the angular velocity of a movement of said work apparatus; and, said triggering criterion is a pregiven angular velocity.

14. The handheld work apparatus of claim 1, wherein said work apparatus is a cut-off machine and said work tool is a cut-off wheel.

15. The handheld work apparatus of claim 14, wherein a rotational speed of said cut-off wheel is at least 4,000 rpm.

* * * * *

UNITED STATES PATENT AND TRADEMARK OFFICE
CERTIFICATE OF CORRECTION

| | | |
|---|---|---|
| PATENT NO. | : 11,685,034 B2 | Page 1 of 1 |
| APPLICATION NO. | : 16/854706 | |
| DATED | : June 27, 2023 | |
| INVENTOR(S) | : S. Hanussek et al. | |

It is certified that error appears in the above-identified patent and that said Letters Patent is hereby corrected as shown below:

On the Title Page

Insert -- (30) Foreign Application Priority Data
May 24, 2014 (DE) 10 2014 007 878 --.

Signed and Sealed this
Nineteenth Day of December, 2023

Katherine Kelly Vidal
*Director of the United States Patent and Trademark Office*